March 20, 1928.
A. E. RAINEY
1,663,060
CHILD'S CONVERTIBLE TOY
Filed Nov. 24, 1926
2 Sheets-Sheet 2
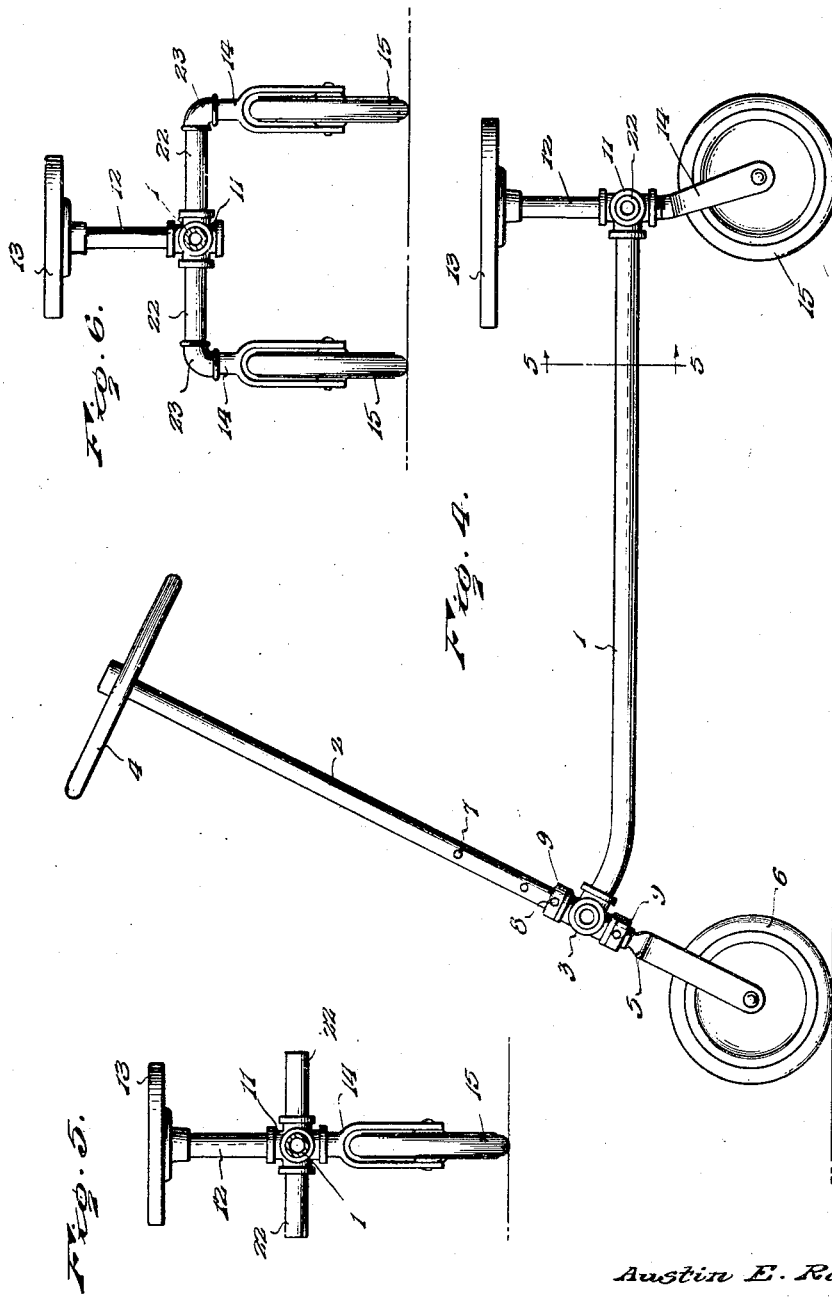
Inventor
Austin E. Rainey.
By Lacey & Lacey, Attorneys Patented Mar. 20, 1928.

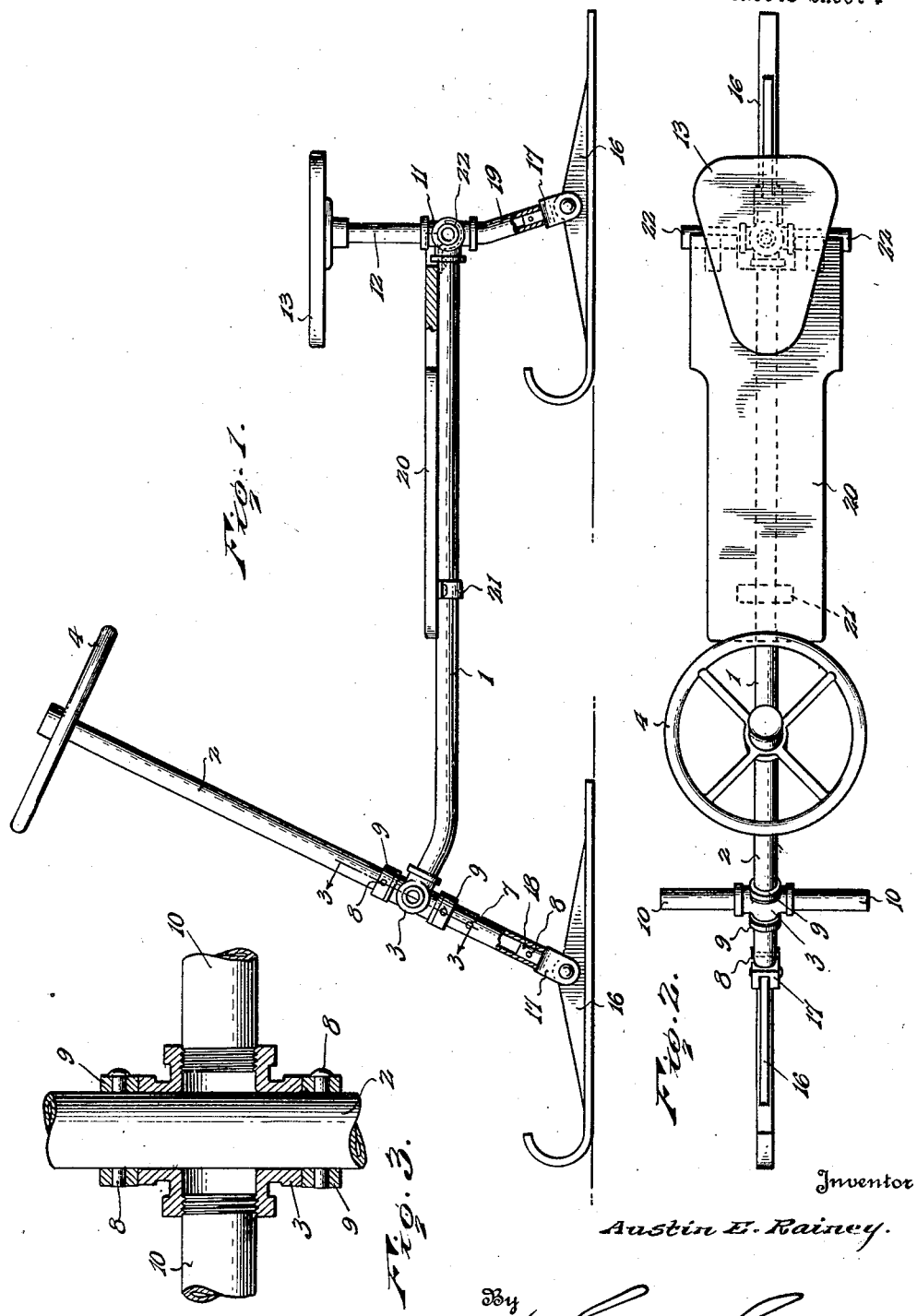

1,663,060

UNITED STATES PATENT OFFICE.

AUSTIN E. RAINEY, OF GROVE CITY, PENNSYLVANIA.

CHILD'S CONVERTIBLE TOY.

Application filed November 24, 1926. Serial No. 150,490.

The invention provides a child's vehicle, of the nature of a sled and wagon, which is readily convertible from one to the other, as required, to meet surface conditions, so that a sled may be had to glide over ice or snow, or a wagon had to trundle over pavements and other surfaces not covered by ice or snow.

The invention provides a convertible vehicle having a body to which runners, or wheels, may be easily fitted without requiring any change in the body other than that necessitated by the interchange, or substitution, of one form of support for the other.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a side view of the vehicle as it appears when adapted for use as a scooter sled.

Figure 2 is a top plan view thereof.

Figure 3 is an enlarged detail sectional view on the line 3—3 of Figure 1.

Figure 4 is a view similar to Figure 1, showing the vehicle adapted for use as a coaster wagon.

Figure 5 is a sectional view on the line 5—5 of Figure 4, looking to the rear as designated by the arrows.

Figure 6 is a view similar to Figure 5, showing the single rear wheel replaced by two wheels, thereby converting the vehicle into a velocipede having three wheels, a front steering wheel, and two rear wheels.

Corresponding and like parts are referred to in the following description and designated in the several views of the drawings by like reference characters.

The single reach bar 1 is straight throughout its length and has its front portion curved upwardly to give a convenient slant or inclination to the steering post or column 2, which is rotatably mounted in the head of a cluster 3 provided at the front end of the reach bar 1. The post or column 2 is provided at its upper end with a steering wheel 4. A fork 5 is adapted to be detachably fitted to the lower end of the steering column or post 2, and receives a wheel 6. The steering post 2 is provided in its length with a plurality of openings 7 which are adapted to coact with pins 8 and collars 9 to hold the post in the required adjusted position, as indicated most clearly in Figures 1 and 4. The stop collars 9 are adapted to engage the ends of that portion of the cluster 3 through which the steering post 2 passes to prevent vertical play thereof, without interfering with its free rotation which is essential for steering. Short arms 10 project laterally in opposite directions from the cluster 3 and constitute rests for the feet of the occupant of the vehicle. A rear cluster 11 similar to the front cluster 3 is coupled to the rear end of the reach bar 1 and receives a seat post 12 to which a seat 13 is attached in any preferred way. A fork 14 similar to the fork 5 is coupled to the depending portion of the cluster 11 and receives a rear wheel 15. Because of the length of the forks 5 and 14 they are coupled directly to the respective clusters, as indicated most clearly in Figure 4.

When the wheels 6 and 15 are replaced by runners 16, as shown most clearly in Figure 1, short forks 17 are provided, and the runners are pivoted intermediate their ends to said forks. The front fork 17 is connected directly to the lower end of the steering post 2 and has a stem 18 fitted into the post 2 and held therein by one of the pins 8 passing through the registering openings formed in opposite sides of the post 2 and stem 18. The rear fork 17 is connected to an extension 19 in substantially the same manner as the front fork is attached to the lower end of the steering post 2, and the extension 19 is coupled to the depending portion of the cluster 11 in a manner to be readily replaced by the fork 14 when it is desired to convert the vehicle into a coaster wagon. A platform 20 is supported upon the rear portion of the reach bar 1 and is adapted to be secured thereto by suitable fastening means, such as a clip 21. Arms 22 project laterally from opposite sides of the rear cluster 11 and provide rests for a second occupant of the vehicle to stand upon. The platform 20 may be utilized as a rest for the feet, or the second occupant may stand thereon.

For converting the vehicle into a tricycle having three wheels two forks 14 are provided, each being supplied with a wheel 15 and these forks 14 are coupled to the outer ends of the arms 22 by means of elbows 23. In this adaptation the single rear wheel shown in Figure 5 is replaced by two wheels, thereby giving stability to the vehicle and preventing tilting thereof, so that a small child may enjoy the device in either adaptation when converted into a wagon or sled.

When converting the vehicle from one adaptation to another, the pins 8 are removed so that the steering post 2 may be moved up or down through the head portion of the cluster 3, so as to occupy either one of the positions shown in Figures 1 and 4. The steering post is secured in the adjusted position by replacing the pins 8, as will be readily understood. To convert the vehicle from the coaster sled, as shown in Figure 1, to a coaster wagon, as shown in Figure 4, the extension 19 with the attached runner 16 and fork 17 is removed and replaced by the forks 14. The several members comprising the frame preferably consist of lengths of pipe and the clusters 3 and 11 consist of T-fittings, the several parts being adapted to be coupled by screw-threads, substantially as indicated most clearly in Figure 3.

Having thus described the invention, I claim:

1. A child's vehicle comprising a reach bar having its front end upwardly deflected, clusters at opposite ends of the reach bar, a steering post vertically adjustably mounted in the vertical portion of the front cluster, a seat post secured within the upper portion of the rear cluster, a supporting element detachably connected to the lower end of the steering post, a second supporting element coupled to the rear cluster, a platform secured to the rear portion of the reach bar, and arms projecting laterally from opposite sides of the rear cluster.

2. A convertible child's vehicle comprising a reach bar having its front portion deflected upwardly, clusters at opposite ends of the reach bar, a steering post adjustably mounted in the vertical portion of the front cluster and provided in its length with a plurality of openings, stop collars on the steering post engaging the ends of the vertical portion of the cluster through which the steering post passes, said collars being provided with openings, pins passing through the registering openings of the stop collars and steering post, a fork detachably fitted to the lower end of the steering post and provided with a supporting element, a seat post secured in the upper portion of the rear cluster, and a fork detachably coupled to the rear cluster and provided with a supporting element.

3. A convertible child's vehicle comprising a reach bar having its front portion deflected upwardly, clusters at opposite ends of the reach bar, a steering post adjustably mounted in the vertical portion of the front cluster and provided in its length with a plurality of openings, stop collars on the steering post engaging the ends of the vertical portion of the cluster through which the steering post passes, said collars being provided with openings, pins passing through the registering openings of the stop collars and steering post, a fork detachably fitted to the lower end of the steering post and provided with a supporting element, a seat post secured in the upper portion of the rear cluster, and a fork detachably coupled to the rear cluster and provided with a supporting element, a platform secured upon the rear portion of the reach bar and arms projecting laterally from opposite sides of both the front and the rear clusters.

In testimony whereof I affix my signature.

AUSTIN E. RAINEY. [L. S.]